May 11, 1926.
G. C. GOODE
REAR HOUSING STRUCTURE
Filed Nov. 9, 1921
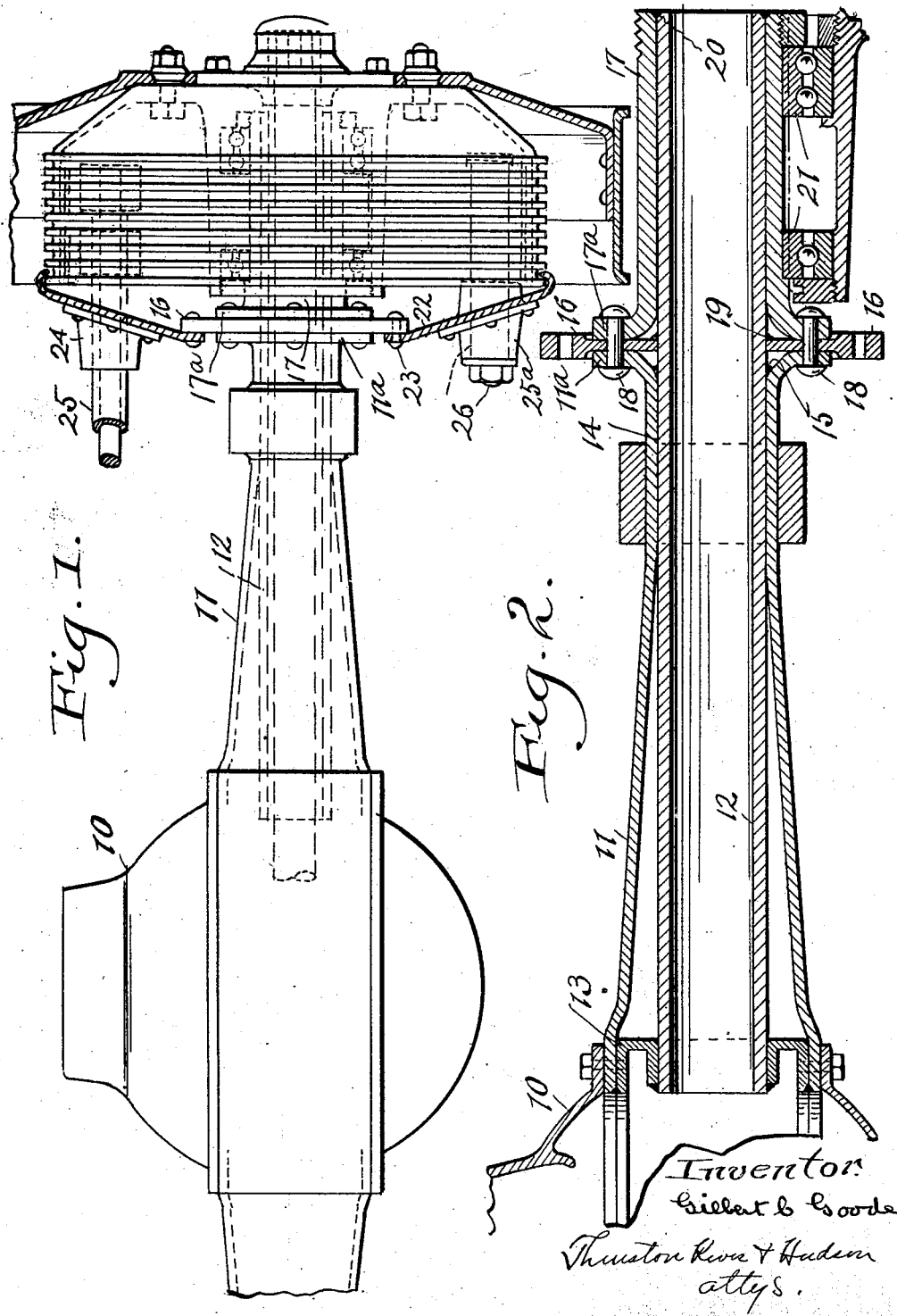

Patented May 11, 1926.

1,583,789

UNITED STATES PATENT OFFICE.

GILBERT C. GOODE, OF CLEVELAND, OHIO, ASSIGNOR TO THE WHITE MOTOR COMPANY, OF CLEVELAND, OHIO, A CORPORATION OF OHIO.

REAR-HOUSING STRUCTURE.

Application filed November 9, 1921. Serial No. 513,924.

The present invention relates to a construction for rear axle housings for motor vehicles and the object of the invention is to provide a construction wherein an axial tube of uniform diameter is used and where the outer end of the axle casing or housing is made as a separate element and attached to the axle housing and permitting the employment as a part of the axle housing of a support for the brake band pivoting and operating mechanism.

Reference should be had to the accompanying drawings forming a part of this specification in which Fig. 1 is an elevation with portions in section; Fig. 2 is a sectional plan view.

Referring to the drawings, the rear axle casing comprises a central portion indicated at 10 which is herein termed a differential housing, and secured to and extending from opposite sides of the differential housing are tapering members 11 which form a part of the outer casing of the rear axle construction.

The construction which is about to be described is duplicated upon both sides of the differential casing or housing 10 and therefore a description of one side will suffice for both.

Within the casing 11 is an axle tube 12 which at its inner end or adjacent the differential housing is supported by means of a collar 13 which has a central opening to receive the end of the axle tube 12 and this collar at its outer end is secured to the inner end of the casing 11.

The casing 11 as before described is a tapering structure and the inner walls converge toward the axle tube 12 and engage with the outer surface of the axle tube 12 along a portion of its outer surface at the point indicated at 14. The casing 11 at its outer end is provided with an up-turned flange 11ª which is substantially circular in form.

At the place where the flange 11ª turns up and away from the axle tube 12, the axle tube 12 and the casing 11 are secured to each other by being brazed or welded as indicated at 15.

The outwardly turned flange 11ª receives an annular disc 16, the function of which will be later described. Co-operating with the outer surface of the disc 16 is an outturned flange 17ª of a tubular member 17, which member in effect forms an extension of the casing 11. The two flanges 17ª and 11ª are secured together by means of rivets or any similar device such as indicated at 18, these rivets extending through the plate 16 so that the three parts are joined together.

The plate 16 has a central opening through which extends the axle tube 12 and for the purpose of additionally supporting the plate 16 against movement, the plate is brazed or welded to the tube 12 as indicated at 19. The inner diameter of the tubular extension 17 is substantially the same as the outer diameter of the tube 12 and the axle tube 12 extends through the tubular extension 17, both tubes being flush at their outer end. For the purpose of securing the outer end of the tubular extension 17, this tube is brazed or welded to the axle tube 12 as indicated at 20.

The tubular extension 17 when made up is of larger diameter than the bearing rings which it is designed to receive, and the tubular extension 17 is turned down to the proper diameter to receive the inner rings 21 of ball bearings upon which the hub of the wheel to be supported is carried.

The live axle by which the wheel proper is driven by the differential gearing, extends through the axle tube 12.

It will be seen from the foregoing construction that the axle tube proper is of uniform diameter throughout its length and hence its strength is not impaired at the outer end by any reduction in diameter as is customary in some forms of axle housing construction.

The plate 16 which has before been described has attached thereto an annular shield which is indicated at 22. This shield is attached to the plate 16 by means of rivets or bolts as indicated at 23. The plate 22 at its upper portion forms a support for a collar 24 through which extend the telescoping shafts 25 that operate the brakes. At its lower portion the annular plate 22 carries a sleeve 25ª in which is mounted the pin 26 upon which the brake segments are pivotally mounted.

The plate structure 16 is very rigidly mounted due to the fact that it is secured not only by means of the rivets 18, but additionally is welded to the axle tube 12. This brazing of the axle tube to the plate 16 is also an additional element of strength in preventing any displacement of the axle tube 12.

Having described my invention, I claim:

1. In a rear axle construction, the combination of a differential housing, a casing extending therefrom, an annular plate having a central opening, which plate is at the outer end of said housing and secured thereto, a tubular member forming an extension of said housing and secured at its inner end to said plate, and an axle tube which extends through the said casing and tubular extension and through the annular plate, said plate being secured to said inner tube.

2. In a rear axle construction, the combination of a differential housing, a casing extending therefrom, said casing at its outer end being provided with an outturned flange, an annular plate having a central opening, which plate lies against the said flange on the casing, a tubular member forming an extension of said housing, said tubular member having a flange at its inner end, which flange engages said plate at its inner end, means securing the said flanges and plate together, and an axle tube which extends through the said casing and tubular extension and through the annular disc.

3. In a rear axle construction, the combination of a differential housing, a casing extending therefrom, said casing at its outer end being provided with an outturned flange, an annular plate having a central opening which plate lies against the said flange on the casing, a tubular member forming an extension of said housing, said tubular member having a flange at its inner end, which flange engages said plate at its inner end, means securing the said flanges and plate together, and an axle tube of uniform diameter extending through the casing, the tubular extension and through the annular disc, said axle tube being secured to the casing, the tubular extension and the said disc.

4. In a rear axle construction, the combination of a differential housing, a casing extending therefrom, said casing at its outer end being provided with an outturned flange, an annular plate having a central opening of the same diameter as the outer end of the casing, said plate lying against the flange on the casing, a tubular member forming an extension of the housing, said tubular member being of the same diameter as the outer end of the casing and having a flange at its inner end engaging the plate, means securing the flanges and plate together, and an axle tube of uniform diameter fitting within the outer end of the casing, the opening of the plate and the tubular extension, the edge of the plate abutting the axle tube being secured to the tube.

In testimony whereof, I hereunto affix my signature.

GILBERT C. GOODE.